United States Patent [19]

Haddox

[11] Patent Number: 4,689,553
[45] Date of Patent: Aug. 25, 1987

[54] METHOD AND SYSTEM FOR MONITORING POSITION OF A FLUID ACTUATOR EMPLOYING MICROWAVE RESONANT CAVITY PRINCIPLES

[75] Inventor: Mark L. Haddox, Ann Arbor, Mich.

[73] Assignee: Jodon Engineering Associates, Inc., Ann Arbor, Mich.

[21] Appl. No.: 722,711

[22] Filed: Apr. 12, 1985

[51] Int. Cl.⁴ .................. G01R 27/04; G01F 17/00
[52] U.S. Cl. .................. 324/58.5 C; 324/58.5 B; 414/5; 73/149
[58] Field of Search ............... 91/189 R; 73/149; 324/58.5 C, 58.5 B; 414/4, 5

[56] References Cited

U.S. PATENT DOCUMENTS

| | | |
|---|---|---|
| 2,421,933 | 6/1947 | Goldstine . |
| 2,491,418 | 12/1949 | Schlesman . |
| 2,520,604 | 8/1950 | Linder . |
| 3,102,232 | 8/1963 | Leonard et al. . |
| 3,312,107 | 4/1967 | Burns et al. . |
| 3,458,808 | 7/1969 | Agdur . |
| 3,703,825 | 11/1972 | Merlo . |
| 3,909,713 | 9/1975 | Billeter . |
| 4,379,991 | 4/1983 | Ho et al. . |
| 4,588,953 | 5/1986 | Krage .............. 324/58.5 C |

FOREIGN PATENT DOCUMENTS 1173438 12/1969 United Kingdom .
1180843 2/1970 United Kingdom .

OTHER PUBLICATIONS

Mark K. Krage, "Locating Piston Position in Penumatic/Hydraulic Cylinders Using Microwaves" (GMR Report) ET-281, 1981.

Primary Examiner—Reinhard J. Eisenzopf
Assistant Examiner—Jose M. Solis
Attorney, Agent, or Firm—Barnes, Kisselle, Raische, Choate, Whittemore & Hulbert

[57] ABSTRACT

A system and method for monitoring position of a piston within a fluid-actuated cylinder by radiating microwave energy into the actuator cylinder and measuring axial position of the piston as a function of microwave resonances and the frequencies at which such resonances occur. Separate microwave transmitting and receiving antenna probes are mounted on one end cap of the actuator cylinder, which has a fixed diameter and an axial dimension which varies as a function of piston position. The transmitting probe is coupled to an oscillator which is controlled to sweep a predetermined frequency range for generating one or more $TM_{01q}$ resonant modes within the cylinder cavity. A threshold detector and a peak detector are coupled to the receiving probe for detecting occurrence of cavity resonances. Latches store oscillator control signals associated with occurrence of up to eight such resonance events, with the stored control signals thus being an indication of resonant frequencies. A microprocessor is programmed to determine cavity length and piston position as a combined function of such resonant frequencies and the corresponding orders q of each frequency.

10 Claims, 9 Drawing Figures

Microfiche Appendix Included
(2 Microfiche, 87 Pages)

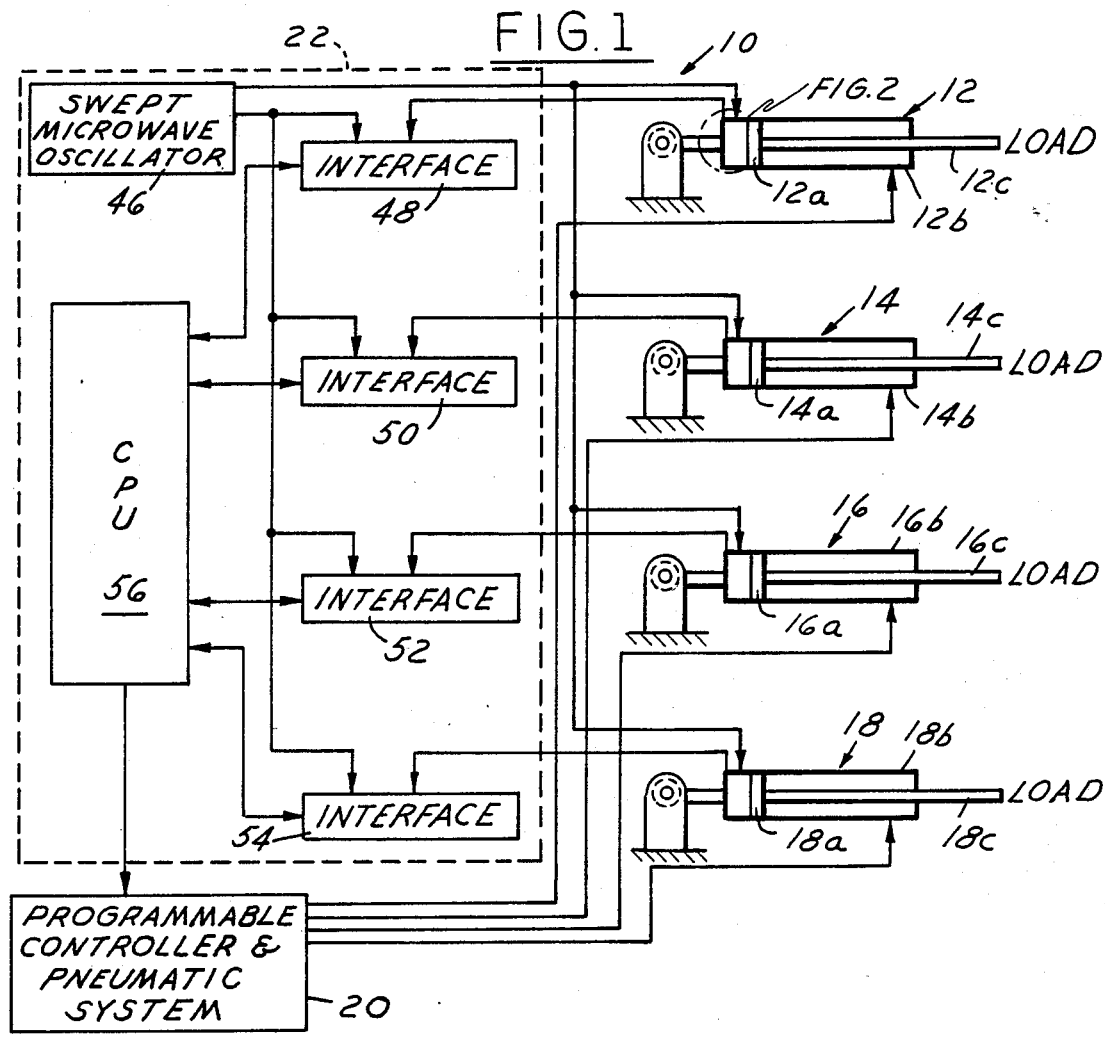
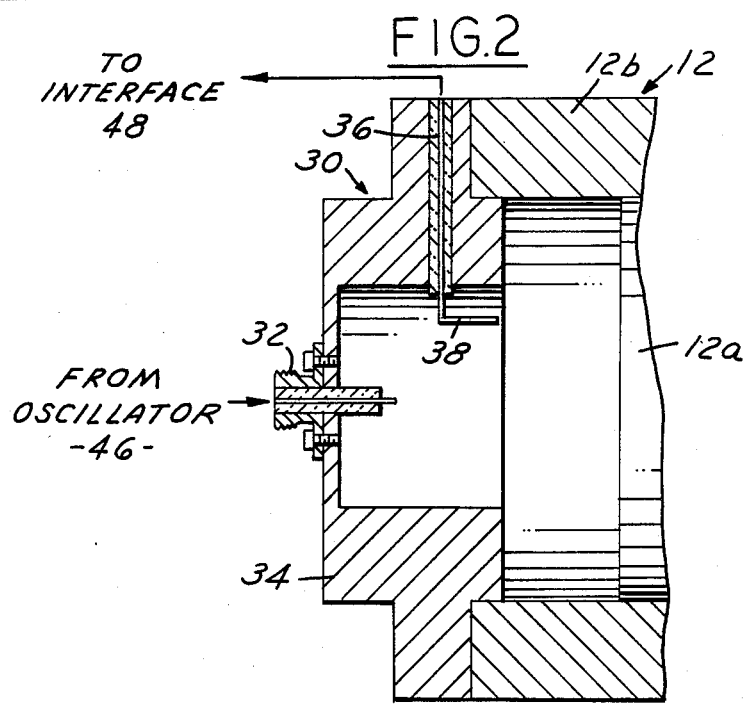

METHOD AND SYSTEM FOR MONITORING POSITION OF A FLUID ACTUATOR EMPLOYING MICROWAVE RESONANT CAVITY PRINCIPLES

Reference is made to a microfiche appendix to this application consisting of 2 sheets of microfiche containing 87 frames.

The present invention is directed to microwave measurement systems and methods, and more particularly to monitoring position of a fluid-driven actuator employing microwave resonant cavity principles within the actuator cylinder.

Fluid actuators, specifically hydraulic and pneumatic actuators, are employed in a wide variety of industrial applications. It is desirable or even necessary in such applications to monitor position of the actuator for control purposes. One common technique for monitoring actuator position is to position electromechanical limit switches so as to be responsive to actuator motion at selected points in the actuator or load path. Where greater adjustability, reliability or continuous control is desired, such limit switches are replaced by or supplemented with a continuously variable transducer, such as an LVDT or a resolver, coupled to the actuator and load. All of these devices possess inherent accuracy and adjustability limitations, require mechanical coupling to the actuator, and are fairly bulky.

It has heretofore been suggested in Krage, "Locating Piston Position in Pneumatic/Hydraulic Cylinders Using Microwaves", GMR ET-281, General Motors Corp. (1981) to utilize microwave resonant cavity principles for monitoring motion of an actuator and load as a function of position of the actuator piston within the actuator cylinder. One approach discussed by Krage utilizes the frequency dependence of microwave resonances as a function of cavity length by radiating microwave energy over a swept frequency range into the actuator cylinder cavity and determining position of the actuator piston within such cavity as a function of the frequencies at which microwave resonances occur. A pre-programmed microprocessor-based lookup table is suggested for relating microwave response to piston position. The Krage paper does not disclose a system or method for implementing the concepts and principles discussed therein.

A general object of the present invention is to provide such a system and method for rapidly and accurately monitoring position of the piston within the cylinder of a fluid-driven actuator or the like utilizing microwave resonant cavity principles and employing the inherent dependence of resonant frequency upon piston position within such cylinders. A more specific object of the invention is to provide a method and system of the described character which may be employed for continuous monitoring of actuator position in fluid-driven actuator applications and which possess the accuracy, repeatability, convenient adjustability, resolution and rapidity of measurement needed both for automated flexible manufacturing systems and for continuous adaptive closed-loop control in conventional industrial applications. Another object of the invention is to provide a method and system of the described character which possess sufficient noise immunity for application in conventional industrial environments.

In accordance with the present invention, piston position within the cylinder of a fluid-driven actuator or the like is monitored as a function of microwave resonant frequencies within the cylinder cavity. Fluid-driven actuators, and other applications in connection with which the present invention is useful, are characterized by possessing nominally constant internal diameter (i.e., substantially constant diameter as a function of varying fluid pressure), so that the microwave frequencies at which resonances occur vary solely as a function of axial position of the piston within the cylinder cavity (assuming constant temperature, etc.). In accordance with a distinguishing feature of the present invention, frequency range and antenna structure are selected in conjunction with predetermined cavity diameter and range of axial lengths such that microwave energy is launched or propagated within the cylindrical cavity in a single preselected normal cylindrical mode for which radial and circumferential field characteristics remain constant throughout the position measurement range, and for which only the axial field characteristics, and thus the axial order component of the resonant modes, vary as a function of cavity length and piston position.

More specifically, in the preferred embodiments of the invention herein disclosed, antenna structure and microwave frequency range are selected in conjunction with predetermined cylinder diameter such that microwave energy in the TM cylindrical mode, having only $TM_{01}$ radial and circumferential field component orders, is launched or propagated within the cylinder cavity. The frequency range for a given cylinder diameter is selected such that resonances within the cylinder cavity are of $TM_{01q}$ resonant modes, with the number of $TM_{01q}$ resonances and the frequencies at which such resonances occur varying as a function of piston position within the cylindrical cavity. In accordance with the method and system of the invention, microwave energy is radiated into the cylindrical actuator cavity and swept over a frequency range selected in the manner described. Resonances are detected as the frequency range is swept, and the frequencies are noted at which such resonances occur. If only one resonance occurs, then resonance $TM_{011}$ is presumed and piston position is computed directly. Otherwise, the orders q for at least some of the detected $TM_{01q}$ resonances are determined using two or more resonant frequencies within the cylinder cavity, and piston position is determined as a combined function of resonant frequencies and corresponding orders.

The invention, together with additional objects, features and advantages thereof, will be best understood from the following description, the appended claims and the accompanying drawings in which:

FIG. 1 is a functional block diagram of a system for monitoring and controlling position of four pneumatic actuators in accordance with the present invention;

FIG. 2 is a fragmentary partially schematic illustration of that portion of FIG. 1 contained within the circle 2, and illustrates microwave cavity antenna structure in accordance with a presently preferred embodiment of the invention;

Figure 3A:
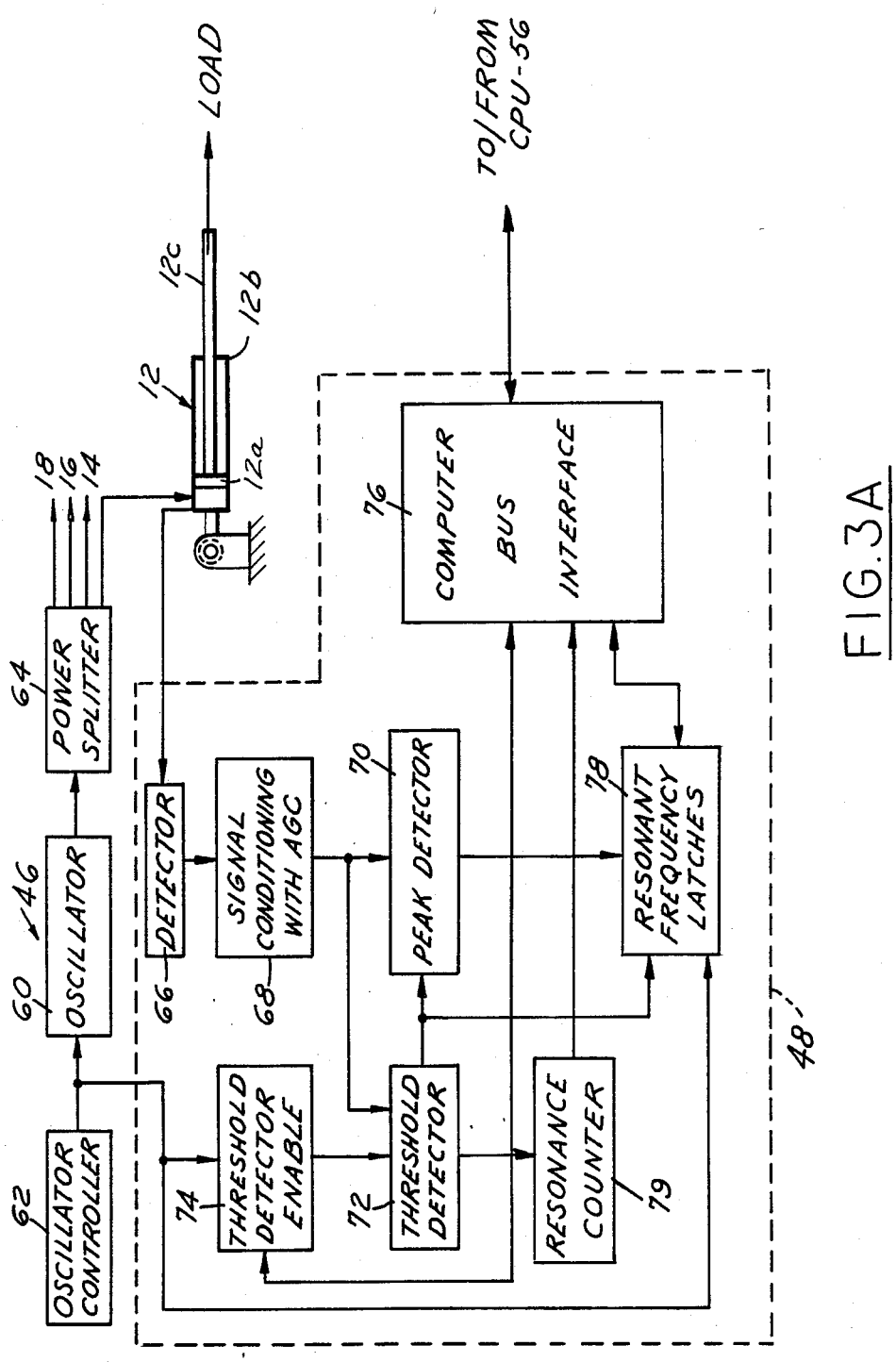
Figure 3B:
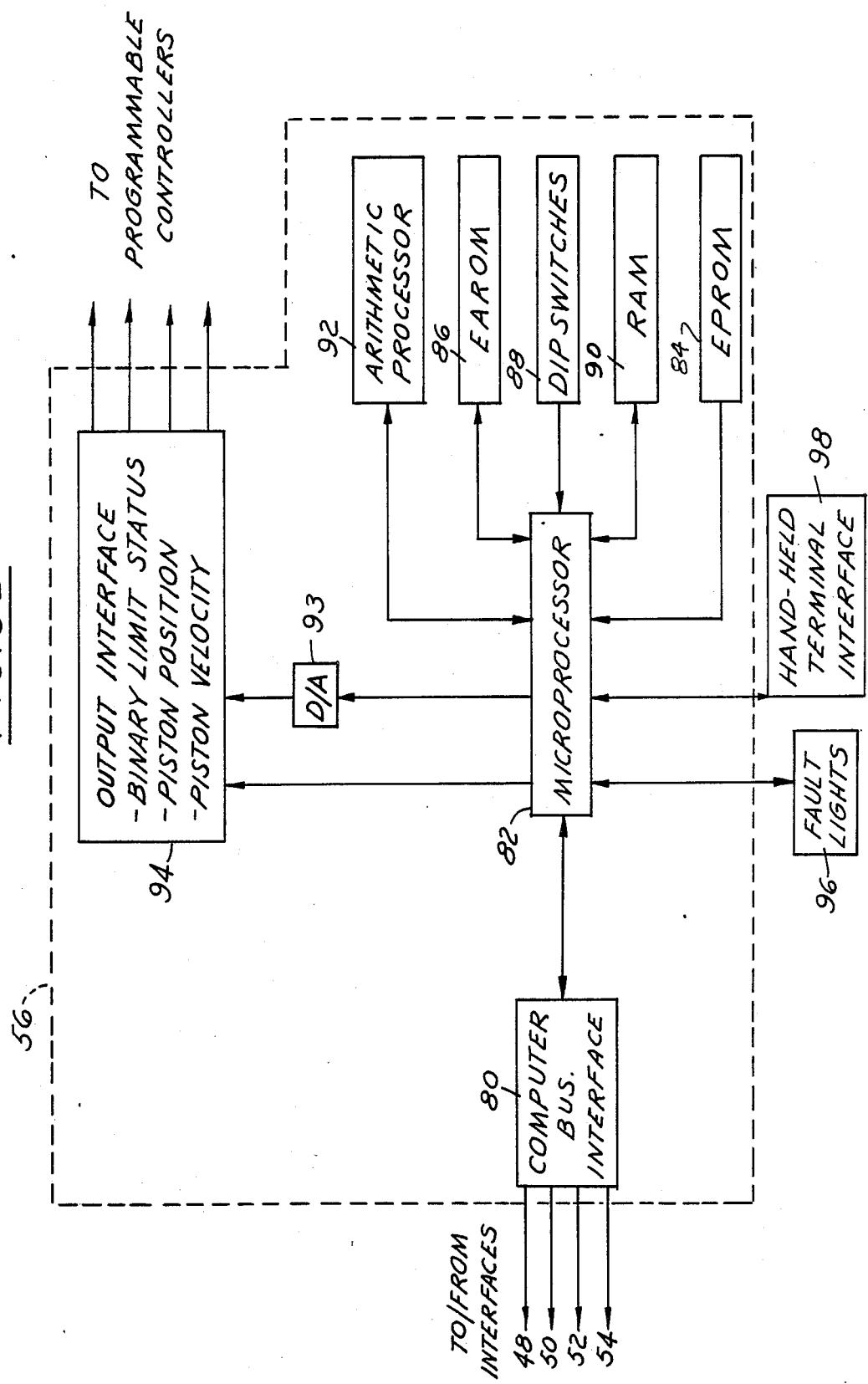
Figure 4:
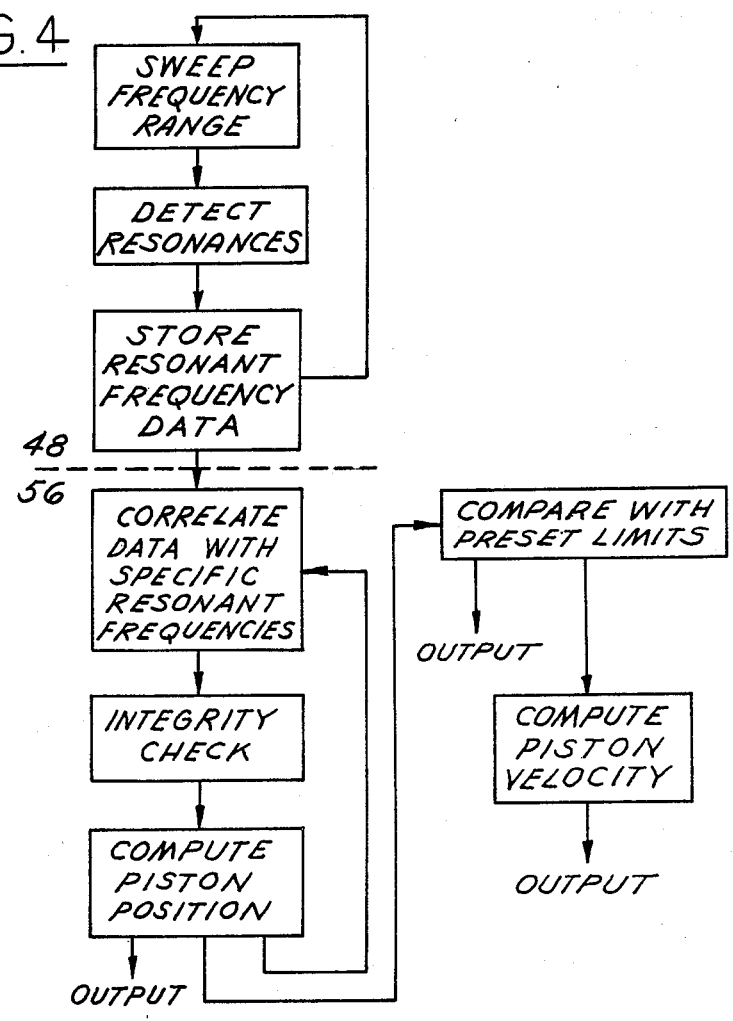
Figure 6:
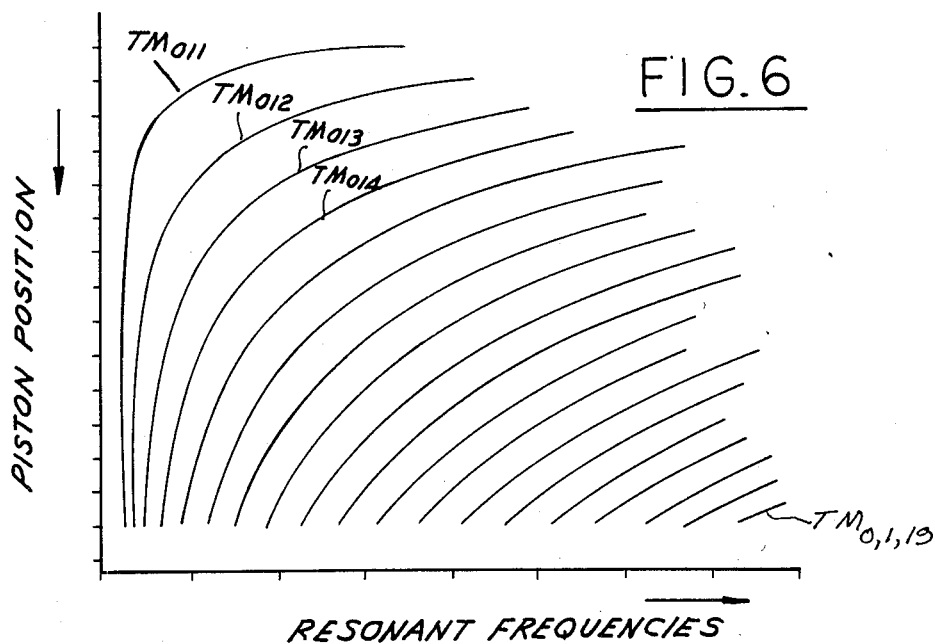
Figure 5A:
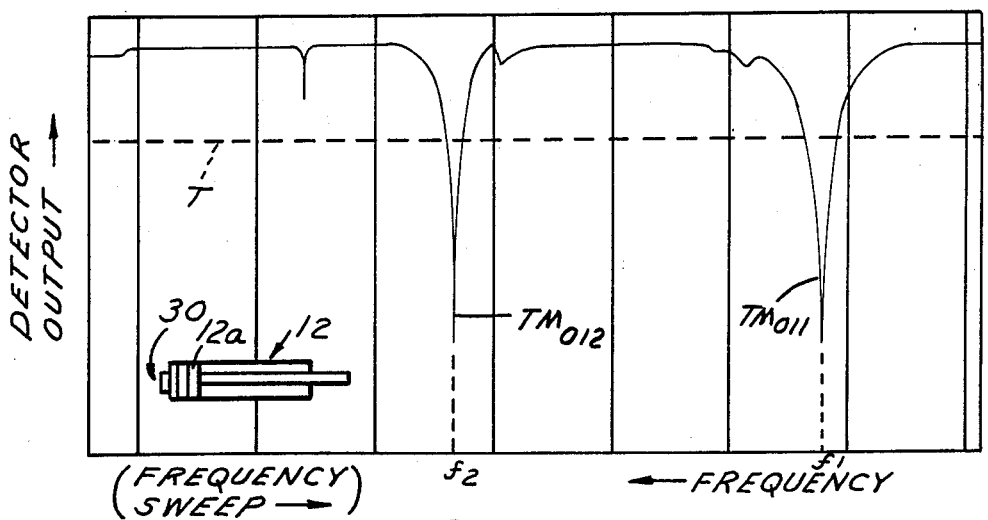
Figure 5B:
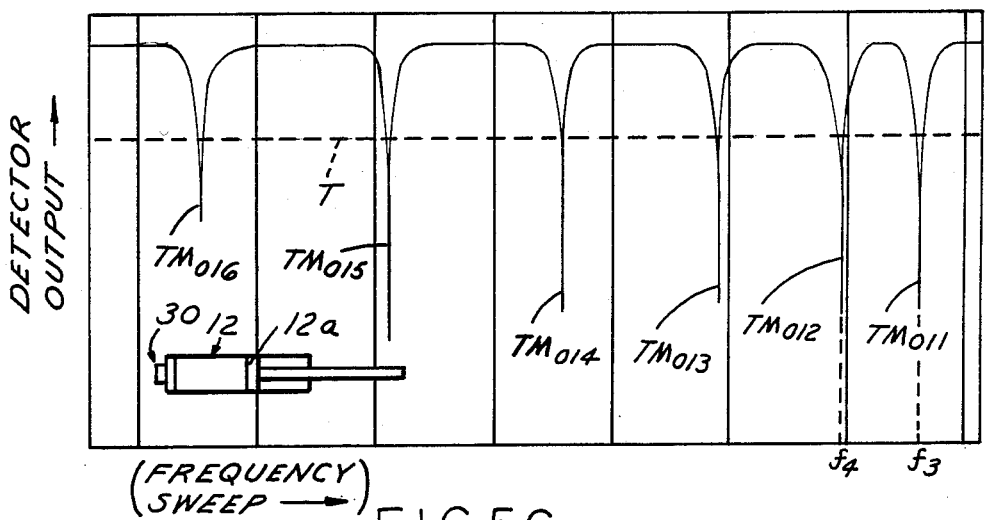
Figure 5C:
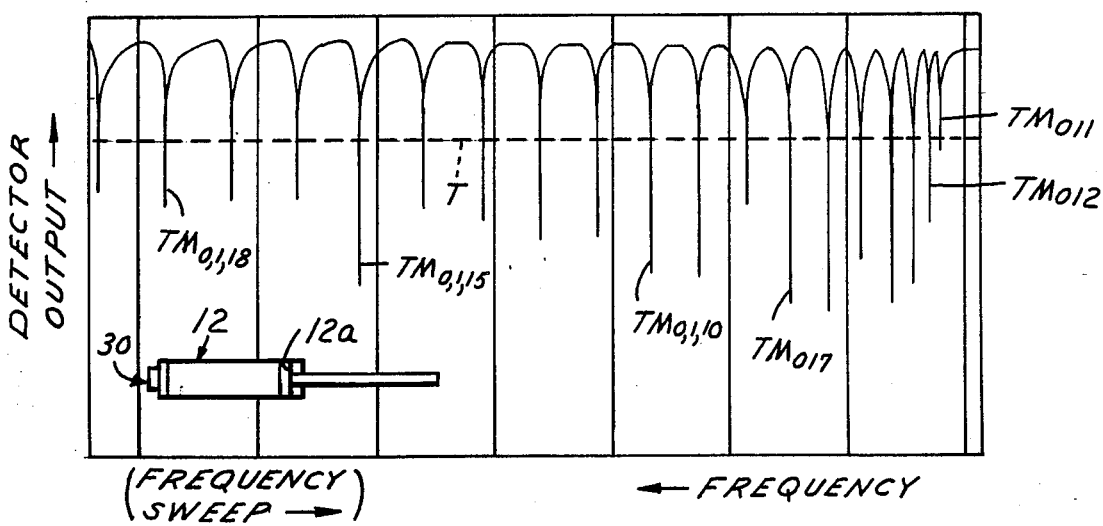

FIGS. 3A and 3B together comprise a functional block diagram of a portion of FIG. 1 in accordance with a presently preferred embodiment of the invention;

FIG. 4 is a flow chart useful in describing operation of the invention;

FIGS. 5A–5C are graphic illustrations relating microwave resonances to exemplary piston positions; and FIG. 6 is a graphic illustration of piston position versus resonant frequency for various resonant modes.

FIG. 1 illustrates an exemplary actuator control system 10 in accordance with the present invention as comprising four pneumatic actuators 12,14,16,18 each having an associated piston 12a-18a slidably disposed within an associated cylinder 12b-18b and coupled by an actuator piston rod 12c-18c to an associated load (not shown). Actuators 12-18 are individually coupled by pneumatic lines to a drive system 20 which includes a programmable controller or the like for obtaining desired motion at the individual actuators and associated loads. A system 22 in accordance with the present invention monitors position of the various actuator pistons 12a-18a and provides position and/or velocity information to the programmable controller. Actuators 12-18 may be of any suitable conventional type. Likewise, drive system 20 may include one or more conventional programmable controllers, suitable servo amplifiers and pneumatic control valves. Various techniques for controlling actuator motion based upon position and/or velocity information feedback are known in the art and need not be discussed further herein. Suffice it to say that the principles of the present invention may be employed in closed-loop position and/or velocity servo control based upon a predetermined actuator control program within drive system 20 or based upon a continuously variable operator input to drive system 20 from a joystick or other suitable control device. The invention may also be employed in open-loop systems for simply monitoring actuator motion.

A microwave antenna assembly is mounted on the end cap of each actuator 12-18. One such antenna assembly 30 is illustrated in FIG. 2, the remainder being identical thereto. Antenna assembly 30 comprises a coaxial microwave probe 32 having an open center conductor centrally mounted on the cylinder end cap 34 for launching microwaves in the normal TM cylindrical mode within the cavity of actuator cylinder 12b. A separate receiving probe 36 comprises an insulated conductor projecting radially through a sidewall of end cap 34 and terminating in an open right-angle bend, with the open end 38 extending axially of cylinder 12b. Thus, probe 36 is configured to receive microwave energy launched by probe 32 in a TM mode. The transmitting or launch probe 32 of each antenna assembly is coupled within system 22 (FIG. 1) to a swept frequency oscillator 46. The receiving probe 36 of each antenna assembly is connected in system 22 to one input of an associated interface circuit 48,50,52,54, each of which receives a second input indicative of frequency information from swept oscillator 46. Interface circuits 48-54 communicate with a central processing unit 56, which provides actuator position and/or velocity control information to the programmable controller of pneumatic drive system 20. FIG. 3A is a detailed functional block diagram of interface circuit 48, and FIG. 3B is a detailed functional block diagram of CPU 56. It will be understood that interface circuits 50-54 are identical to interface circuit 48 illustrated in FIG. 3A, and are likewise coupled to CPU 56 as illustrated in FIGS. 1 and 3B.

Referring to FIG. 3A in greater detail, swept microwave oscillator 46 includes a variable frequency oscillator 60 which receives a digital frequency-control input from an oscillator controller 62. The output of oscillator 60 is fed through a power splitter 64 individually to each of the antenna assemblies 30 (FIG. 2) at actuators 12-18, only connection to actuator 12 being illustrated in FIG. 3A. For improved suppression of spurious noise, an isolator may be placed between oscillator 60 and power splitter 64. The return signal from actuator 12 is fed to a microwave detector 66, which is illustrated in FIG. 3A within interface circuit 48 but which may be mounted on antenna assembly 30 (FIG. 2) immediately adjacent to probe 36 for enhanced noise immunity. The demodulated microwave signal from detector 66 is fed to a signal conditioning circuit 68 which provides suitable filtering and automatic gain-controlled amplification. The output of signal conditioning circuit 68 is fed to the signal inputs of a peak detector 70 and a threshold detector 72. Threshold detector 72 is controlled by a threshold detector enable circuit 74 which receives a signal input from the frequency-control output of oscillator controller 62 and a control input from a computer bus interface 76. Threshold detector 72 provides control inputs to peak detector 70 and to a bank of eight resonant frequency registers or latches 78. Latches 78 receive a second control input from peak detector 70, and receive a signal input from oscillator controller 62. The outputs of latches 78 are connected to computer bus interface 76, which is itself connected by a bidirectional communication bus to CPU 56 (FIGS. 1 and 3B). A resonance counter 79 receives input from threshold detector 72 and provides output to computer bus interface 76.

In operation of swept frequency oscillator 46 and interface circuit 48 (FIG. 3A), oscillator controller 62 is configured to continuously and periodically sweep a preselected frequency range by providing a correspondingly varying digital frequency-control input to oscillator 60. As previously indicated herein, this frequency range is selected in part as a function of cavity diameter. In one working embodiment of the invention, oscillator 60 comprises an Avantek ADD-7238/A YIG-tuned oscillator swept from 8 GHz to 2 GHz in 4095 digitally controlled steps in ten milliseconds, followed by a ten millisecond return and pause delay, thus resulting in a total cycle time of twenty milliseconds. As is well-known in the art, microwave energy fed to the cavity of actuator cylinder 12 is substantially absorbed only at the cavity resonant frequencies, so that the output voltage of detector 66 is normally at a relatively high level (i.e., near circuit ground) with distinct dips or inverted peaks (i.e., negative voltage) at the various resonant frequencies within the cylinder cavity. FIGS. 5A 5C illustrate detector output voltage as a function of frequency at three exemplary positions of piston 12c within actuator 12. In FIG. 5A, when piston 12a is relatively close to the microwave antenna assembly and the cavity axial dimension is thus relatively small, only the first and second axial orders of the propagated $TM_{01}$ mode are detected—i.e., the $TM_{011}$ resonant mode at frequency f1 and the $TM_{012}$ resonant mode at higher frequency f2. To monitor the total predetermined range of axial motion in accordance with the present invention, it is important that microwave frequency range be coordinated with the predetermined minimum axial dimension of the resonant cavity so that at least the lowest order of resonance, i.e. the $TM_{011}$ resonant mode, will occur at the lower-limit position of the cavity piston. That is, the maximum oscillator frequency must be greater than the $TM_{011}$ resonant frequency at the lower-limit piston position.

At extreme near end positions, the $TM_{011}$ resonant mode may become unacceptably high in frequency. To monitor piston position when the piston is retracted fully within the cylinder, the cavity for antennas 32 and 38 may be increased in depth and diameter so as to approximately resemble an extension of the cylinder cavity. Of course, there must remain a near end barrier against which the piston can stop. By increasing the apparent length of the cavity while holding constant the axial limits of travel, extreme near end and fully retracted positions of the piston can be monitored with a lower-frequency $TM_{011}$ resonance. Position computations may thus, for example, show a cavity length of two inches when the piston is retracted fully against the near end barrier. This two inch offset could be subtracted from all computations of piston position so as to give piston position with respect to the near end barrier.

As piston 12a moves away from antenna assembly 30, i.e., to the right in the drawings, the axial dimension of the cylinder cavity increases and additional resonances occur as the oscillator frequency is swept. Moreover, the resonant frequency of each given mode decreases as cavity length increases. Thus, with piston 12a in an intermediate position in FIG. 5B, resonant mode $TM_{011}$ occurs at frequency f3 which is less than frequency f1 in FIG. 5A, mode $TM_{012}$ at frequency f4 less than f2, etc. Moreover, additional resonances at modes $TM_{013}$ through $TM_{016}$ occur as the range of oscillator 46 is swept. (It will be borne in mind that the sweep of oscillator 46 is from high to low frequency, so that resonant mode $TM_{016}$ actually occurs first in time in FIG. 5B.) In FIG. 5C, with piston 12c approaching its remote (from antenna assembly 30) limit of travel, nineteen $TM_{01}$ resonant modes may occur. Again, it is important in accordance with the present invention that the maximum monitored oscillator frequency for a given cylinder diameter be chosen such that only resonances of low-order radial and circumferential field characteristics—i.e., $TM_{01q}$ resonances—occur within the monitored frequency range. In one working embodiment of the invention, the cylinder cutoff frequency (i.e., the frequency below which there can be no $TM_{01q}$ resonances) is approximately sixty percent of the highest monitored frequency. FIG. 6 is an exemplary map of resonant frequencies versus piston position for various $TM_{01q}$ resonant modes, with q being an integer greater than zero. (The $TM_{010}$ mode is independent of cavity length.)

Returning to FIG. 3A, the output of detector 66 is fed through signal conditioning circuit 68 to peak detector 70 and to threshold detector 72. Threshold detector enable circuit 74 is preset by CPU 56 through bus interface 76 so as to condition the remainder of interface 48 to monitor only frequencies within a predetermined range based primarily on cylinder diameter such that only $TM_{01q}$ resonances will occur within the axial limits of piston travel within actuator 12. (Thus, when the description speaks of oscillator frequency limits, it is speaking of monitored frequency limits for a given cylinder rather than actual frequency limits of the osillator.) When the frequency control output of controller 62 is within the monitor range of detector enable circuit 74, peak detector 70 is enabled by threshold detector 72 to transmit a signal to latches 78 whenever the output of detector 66 decreases below an empirically selected threshold T set by detector 72 and illustrated graphically in FIGS. 5A-5C. When thus enabled by threshold detector 72, peak detector 70 finds a single resonant peak corresponding to the lowest voltage encountered while below threshold T. Peak detector 70 is not reset and ready to find the next peak until the detector 66 output voltage rises above the again falls below threshold T. Latches 78 are responsive to the first eight of such peak-detected signals to store corresponding frequency information from the frequency-control output of oscillator controller 62, with the stored information thus being an indication of the frequencies at which the detected resonances occurred. Counter 79 is used in conjunction with threshold detector 72 to count the total number of resonances that occur within the frequency sweep. When later computing piston position, this count can be used, for example, as a general indication of the number of resonances found during the sweep.

Since the actuator cavity has the geometry of a right circular cylinder for which only one dimension is unknown, i.e. axial length, it is possible in accordance with the method to be described to determine unknown cavity length upon detection of only one resonance. However, for enhanced resolution at positions substantially beyond the near end axial limit, it is preferred to detect several such resonant conditions, and to employ the higher-order or higher-q frequency readings to determine cavity length. Thus, latches 78 preferably comprise eight latches for storing resonant frequency information corresponding to the first eight (or fewer) resonances within each frequency sweep. Since frequency is swept from high to low, the information so stored will automatically correspond to the highest-order resonant modes. When the frequency-control output of controller 62 indicates that oscillator frequency has passed outside of (below) the monitor range, further storage of data in latches 78 is inhibited, and CPU 56, through bus interface 76, loads stored frequency information and computes actuator piston position.

CPU 56 is illustrated in FIG. 3B as comprising a computer bus interface 80 having I/O channels connected to the interfaces 76 of interface circuits 48-54 (FIGS. 1 and 3A). A microprocessor 82 communicates with computer bus interface 80. Microprocessor 82 is also connected to an EPROM 84 is connected to microprocessor 82 and stores information such as cylinder diameter and cylinder limit positions. Dipswitches 88 may provide an operator input to microprocessor 82 to configure the microprocessor for a particular operational or diagnostic mode. A RAM 90 is connected to microprocessor 82 for temporary information storage, and a separate arithmetic processor 92 is coupled to microprocessor 82 for performing specific arithmetic operations and thereby increasing overall CPU speed. In a working embodiment of the invention, microprocessor 82 comprises a Motorola 6809 microprocessor and arithmetic processor 92 comprises two cascaded RCA CDP 1855C programmable multiplier/divide units. Microprocessor 82 is part of a Motorola M68MM19-1 monoboard micro computer. EAROM 86 comprises a Mostek MK48Z02 RAM chip with battery back-up. A corresponding program stored in EPROM 84 for controlling operation of CPU 56 in the manner to be described is listed in a microfiche appendix to the application. Microprocessor 82 is coupled directly and through a D/A converter 93 to an output interface 94 for providing outputs to the programmable controller of drive system 20 (FIG. 1) indicative of measured piston position, binary limit status corresponding to limit switch-type information at positions stored on EAROM 86, and/or piston velocity which may be computed by microprocessor 82 based upon incremental position change between measurement sequences. Microprocessor 82 also provides fault outputs to associated lights 96, and is adapted for connection to a handheld terminal interface 98 for setup and diagnostic purposes.

In the above-mentioned working embodiment of the invention, interface 98 comprises a Termiflex Corporation Model HT-20 terminal connected to microprocessor 82 via an RS-232 serial port. Actuator cylinder size and limit positions are stored in EAROM 86 via interface 98 and microprocessor 82. This arrangement is advantageously adaptable to automated flexible manufacturing systems wherein it is desirable to be able to frequently reprogram electronically such parameters as cylinder limit positions. Whereas a mechanical limit switch would require manual repositioning, the system described herein can be reprogrammed by a programmable controller or remote computer.

Overall operation of the system 22 of the invention is illustrated in FIG. 4. The several interfaces 48–54 (FIGS. 1 and 3A) function simultaneously to collect resonant frequency data. CPU 56 handles information from all four interfaces simultaneously. The combination of interface 48 and CPU 56 will be discussed in detail. Initially, swept microwave oscillator 46 is controlled to sweep the frequency range of interest, microwave resonances are detected and resonant frequency data is stored in latches 78 (FIG. 3A) as hereinabove described. When this cycle is completed, CPU 56 loads stored frequency information from latches 78, and the frequency sweep cycle is repeated after a delay interval. In the meantime, CPU microprocessor 82 (FIG. 3B) correlates such frequency data with specific resonant frequencies via a predetermined mathematical relationship between said data and said frequencies. An integrity check is then performed on the resonant frequency data using actual-versus-predicted spacing between resonant frequencies. The integrity check may include comparison with immediately preceding frequency data which should be similar to, although not necessarily identical with, current data. If integrity is indicated, piston position is computed. If the integrity check fails, a corresponding fault light 96 is illuminated.

In a right-circular cylindrical cavity, resonant frequency of a $TM_{01q}$ mode is given by the following equation:

$$f = \frac{1}{2\pi(ue)^{\frac{1}{2}}} \left[ \left(\frac{x_{np}}{a}\right)^2 + \left(\frac{q\pi}{L}\right)^2 \right]^{\frac{1}{2}} \quad (1)$$

where f is resonant frequency; $1/(ue)^{\frac{1}{2}}$ equals the speed of light within the cavity, or $3 \times 10^{11}$ mm/sec in a pneumatic actuator; $x_{np}$ equals the pth root of the Bessel function $J_n(X)=0$, or 2.40483 for a $TM_{01q}$ mode; a is cavity radius in mm; q is the order of the resonant mode; and L is cavity length in mm. The factor $1/(ue)^{\frac{1}{2}}$ will vary as a function of the physical properties of the fluid medium. Solving for L gives:

$$L = \frac{150 q}{(f^2 - f_c^2)^{\frac{1}{2}}} \quad (2)$$

where $f_c$ is the cutoff frequency (i.e., with q=0 in equation (1)) in GHz and f is the frequency of the qth resonance in GHz. In the above-mentioned actual working embodiment of the invention, compensation is added to equation (2) to accommodate antenn reactance, yielding:

$$L = \frac{150 q - S}{(f^2 + f_c^2)^{\frac{1}{2}}} \quad (3)$$

where S is a constant related to antenna reactance. The antenna reactance constant S is empirically determined using a manually adjustable oscillator and an accurate microwave frequency counter. For several known cavity lengths L, resonances are tuned and measured for both frequency f and order q. Using the computed value for $f_c$, measured values for L, q and f, and equation (3), one can then solve for S. If the several cavity lengths L are chosen so as to represent the full range of expected piston travel, then the derived values of S can be averaged to give a value for S that will be optimal for the range of piston travel. Where the length L is long and a substantial number of resonances occur (e.g., FIG. 5C), it is desirable to avoid the need to find the order q of each resonance by simply counting resonances. A q-independent equation for cavity length L can be derived from equation (3) as follows:

$$L = \frac{150 m}{(f_2^2 - f_c^2)^{\frac{1}{2}} - (f_1^2 - f_c^2)^{\frac{1}{2}}} \quad (4)$$

where m is the difference between the order q of resonant frequency $f_1$ and the order q of resonant frequency $f_2$.

Thus, in accordance with the basic principles of the present invention, piston position, i.e. cavity length L, is determined as a combined function of resonant frequency f and order q per equation (3). Where only one resonant peak is found, the order q thereof is presumed to be one, and piston position is determined per equation (3). If two resonant peaks are found at frequencies f1 and f2 (FIG. 5A), resonant order difference m is presumed to be 1. A nominal value for cavity length L is computed per equation (4). This value for cavity length is then used to solve for resonant order q (rounded to an integer) for the higher-frequency resonance per equation (3). If q is greater than 3, one of the two resonances is presumed to be an unwanted spurious resonance in the vicinity of the single valid resonance, and q is set equal to 1. In either case, q and the higher frequency are then used to compute cavity length L per equation (3).

If three resonant peaks are found at frequencies f1, f2 and f3, the adjacent pair (f1,f2 or f2,f3) with the larger difference in frequency is used to compute q as described immediately above. In this case, q must be 2, 3 or 4. If q is greater than 4, two of the three resonances are presumed to be unwanted spurious resonances in the vicinity of the single valid resonance, and q is set equal to 1. With q equal to 1, 2, 3 or 4, resonant order q and the higher frequency of the selected pair (f1,f2 or f2,f3) are then used to compute cavity length L per equation (3).

If four to ten resonances are found (FIG. 5B), the spacing between resonances will continue to be sufficiently large to allow the use of two consecutive resonances (i.e., m=1) for computation of cavity length. The average (or, for eight to ten resonances, the median) difference in frequency between consecutive resonances in latches 78 is computed, and frequency differences of less than one-fourth of the average are rejected as manifestations of unwanted spurious resonances. A second average of remaining frequency differences is computed, and a resonant pair is selected such that its difference is the smallest possible difference that still exceeds the second average frequency difference. This selected resonance pair is assumed to comprise valid consecutive resonances (m=1), and the two resonant frequencies are used with equation (4) to compute a nominal value for cavity length L. This value for cavity length is then used to solve for q (rounded to an integer) of the higher-frequency resonance per equation (3). Finally, q and the higher frequency are used to compute cavity length L per equation (3).

If more than ten resonances are found (FIG. 5C), the use of consecutive resonance for cavity length determination can result in significantly reduced measurement resolution. Accordingly, of the eight resonances stored in latches 78, the lowest and highest valid resonances are used to compute cavity length. The median difference in frequency between consecutive resonances is found, and frequency differences of less than one-fourth of the median are rejected as manifestations of unwanted spurious resonances. An average of remaining frequency difference is computed, and resonant order difference m is computed for the separation between the remaining highest and lowest resonant frequencies. More specifically, difference m is identified as a small positive integer such that m multiplied by the average difference in frequency will best approximate the frequency difference between the remaining highest and lowest resonant frequencies. These frequencies and their computed order difference m are used with equation (4) to compute a nominal value for cavity length L. This value for cavity length is used to solve for q (rounded to an integer) of the higher-frequency resonance per equation (3). Cavity length L may then be computed per equation (3) using q and the higher frequency.

Returning to FIG. 4, piston position is then fed to the programmable controllers in either analog or digital form, and/or piston position is compared with the limits set in EAROM 86 (FIG. 3B) and corresponding binary limit status information is fed to the programmable controllers, and/or piston velocity is determined by comparison with preceding position readings and fed to the programmable controllers.

The two-probe antenna structure 30 illustrated in FIG. 2 eliminates problems associated with base-line drift, and is presently preferred. However, it is also contemplated that a single probe may be employed, and a circulator or the like placed between the swept oscillator and the probe for feeding oscillator output to the probe and return signals to the associated system interface. Where a single probe structure of this type is employed, the detector output may be subjected to suitable digital or analog filtering for isolating resonant peaks. It is also contemplated that the various separate elements of interface 48 (FIG. 3A) may be embodied in a custom integrated circuit, a single suitably programmed microprocessor, or the like. This modification may be particularly advantageous in combination with a single-probe antenna structure since the requisite digital filtering may then be carried out in such microprocessor.

As previously noted in detail, the preferred implementation of the invention employs $TM_{01q}$ resonance modes for determining cylinder length, with q being an integer equal to or greater than one. It is also envisioned in a modified embodiment of the invention to employ TE modes, specifically $TE_{11q}$ modes. For such TE modes, the factor $x_{np}$ in equation (1) is replaced by a similar factor $x'_{np}$ which equals the pth root of the Bessel function derivative $J_n'(X)=0$, or 1.841 for a $TE_{11q}$ mode. Computations are observed similar to those hereinabove discussed.

The invention claimed is:

1. Apparatus for monitoring position of a piston within a cylinder comprising
    means for generating microwave radiation over a preselected swept frequency range, antenna means coupled to said generating means and positioned in said cylinder to inject said microwave energy into said cylinder such that resonances of differing axial order and constant radial and circumferential orders of a single normal cylindrical mode of microwave propagation are developed within said cylinder as said generating means sweeps said frequency range, occurence-detecting means coupled to said antenna means for detecting occurrence of said resonances, and position-determining means responsive to said detecting means and to said generating means for determining position of said piston within said cylinder as a function of frequency of said microwave signal at which said resonances occur,
    characterized in that said position-determining means comprises means for identifying axial order of one said resonance, means coupled to said generating means for identifying microwave frequency associated with said one resonance, and means for determinig position of said piston within said cylinder as a combined function of said axial order and said frequency of said one resonance.

2. The apparatus set forth in claim 1 wherein said position-determining means comprises means for counting number of apparent resonances detected during a single sweep of said generating means, mode selecting means responsive to said counting means for selecting among differing modes of operation as a function of said number of apparent resonances, at least one of said modes being selected when two or more of said apparent resonances are detected, and means responsive to said mode-selecting means and operable in said one mode for determining position of said piston as a function of frequencies associated with at least one pair of adjacent resonances.

3. The apparatus set forth in claim 2 wherein said means responsive to said mode-selecting means comprises means for identifying a pair of adjacent resonances, means for determining said axial order of the higher resonant frequency associated with said pair of resonances, and means for determining said piston position as a function of frequency and axial order of the resonance having said higher resonant frequency.

4. The apparatus set forth in claim 2 wherein said antenna means comprises separate transmitting and receiving antennas positioned adjacent to one axial end of said cylinder, said transmitting antenna being coupled to said generating means and said receiving antenna being coupled to said occurrence detecting means, said occurrence-detecting means being responsive to energy obsorbed in said cylinder as a function of energy received at said receiving antenna.

5. A method of monitoring axial position of a piston within a right circular cylinder, said method comprising the steps of:
    (a) injecting microwave radiation into said cylinder,
    (b) sweeping said microwave radiation over a frequency range preselected to generate resonances of differing axial order and constant radial and circumferential orders of a preselected normal cylindrical resonant mode within said cylinder,
(c) detecting occurrence of at least one resonance within said cylinder as said radiation is swept through said frequency range,
(d) identifying the frequency of said microwave radiation at which said at least one resonance occurs,
(e) identifying the axial order of said at least one resonance, and
(f) determining position of said piston within said cylinder as a combined function of resonant frequency identified in said step (d) and said order identified in said step (e).

6. The method set forth in claim 5 wherein said step (c) comprises the step of detecting occurrence of a plurality of said resonances, wherein said step (d) comprises the step of identifying frequencies of said microwave radiation at which two adjacent resonances occur, and wherein said step (e) comprises the steps of:
(e1) estimating position of said piston within said cylinder as a function of said frequencies at which said two resonances occur while assuming that said adjacent resonances are of successive axial order,
(e2) estimating order of one of said resonances as a function of frequency associated therewith identified in said step (d) and said estimated position, and then
(e3) rounding said order estimated in step (e2) to the nearest integer.

7. The method set forth in claim 6 wherein said step (f) comprises the step of determining piston position as a function of said order estimate rounded in said step (e3) and the higher said frequency associated with said two resonances.

8. The method set forth in claim 6 wherein said step (d) comprises the step of identifying frequencies of said microwave radiation at which three adjacent resonances occur; and wherein said step (e) comprises the additional step of: (e4) determining the greater frequency separation between adjacent resonances at said three frequencies, and then (e5) employing the adjacent resonances associated with such greater separation in said steps (e1) through (e3).

9. The method set forth in claim 6 wherein said step (e1) comprises the step of estimating said piston position as a function of the expression $150/((f_2^2-f_c^2)^{\frac{1}{2}} - (f_1^2-f_c^2)^{\frac{1}{2}})$, where $f_1$ and $f_2$ are said frequencies of said adjacent resonances identified in said step (d), and $f_c$ is the cutoff frequency of said cylinder.

10. The method set forth in claim 6 wherein said steps (a) and (c) are carried out employing respective separate antennas positioned within said cylinder.

* * * * *